Dec. 26, 1967     ERICH-ARTHUR NIER ET AL     3,359,671
SIGNBOARD, MORE PARTICULARLY TRAFFIC SIGN
Filed April 25, 1963

ERICH-ARTHUR NIER
RICHARD ERNST NIER
HANS E. GUBELA
　　　　　　INVENTORS

BY
Darbo, Robertson &
　　Vandenburgh 3,359,671
SIGNBOARD, MORE PARTICULARLY TRAFFIC SIGN
Erich-Arthur Nier, and Richard Ernst Nier, both of Am Erlenhang, Bleidenstadt, Taunus, Germany, and Hans E. Gubela, 80 Hohne, Wuppertal-Barmen, Germany
Filed Apr. 25, 1963, Ser. No. 275,631
Claims priority, application Germany, May 2, 1962, G 34,868
3 Claims. (Cl. 40—135)

This invention relates to a signboard, more particular a traffic sign, which is distinctly recognizable by daylight as well as at night when illuminated by foreign light, such as by an automobile or locomotive headlight. Many types of such signboards are known which are fitted with reflex reflectors. Reflex reflectors are reflectors which reflect the incident light substantially back into the direction of incidence, thus neither reflect specularly (angle of incidence—angle of reflection), or diffusely. If such a reflex reflector is, for instance, illuminated by an automobile headlight, the driver of the car considers it to be very bright, if he is looking approximately in the direction of the emergent beam of rays, as the reflex reflector reflects practically all incident light back into this direction of incidence. Therefore, the reflex reflector is substantially more clearly recognizable at night when illuminated by a headlight than a surface reflecting diffusely in accordance with the Lambert's law, from which surface only a small portion of the incident light is reflected straight back into the direction of incidence, or a simple mirror which reflects the light into any direction in dependence on the mirror inclination which only by chance may coincide with the direction of incidence.

To utilize this favorable property of reflex reflectors for signboards (traffic signs etc.), the signs have been provided with foils or coats of paint, where small glass balls are embedded in a transparent pigment layer. By refraction and total reflection of the incident light rays on these balls it is achieved that the incident light is substantially reflected back into the direction of incidence. With these simple type reflex reflectors, the light is, however, reflex reflected in a still relatively great solid angle so that the intensity of the reflected light becomes too weak at longer ranges as to ensure a clear recognition of the signboard or traffic sign. A further disadvantage of the known arrangements consists in the fact that the rough surface of the traffic sign covered with glass balls is subjected to substantial depositing of dirt and to weathering.

Reflex reflectors are further known which consist of a plurality of reflecting hollow cube corners (triples) arranged side by side. Such a triple also has the property of always reflecting incident light rays back parallely to themselves. The solid angle in which the incident beam of rays is reflected by such triple reflectors is substantially smaller than with the reflectors of the first described type provided the reflector is accurately finished to some degree. Thus, a sharp beam of light is reflected back into the direction of incidence by the reflector so that the triple reflector appears very bright and distinctly recognizable also at longer ranges. It is customary to have such reflectors consist of transparent plastic parts with smooth front face and rear totally reflecting cube corners which are provided with an air- and water-tight backing plate.

Such triple reflectors have been utilized for traffic signs and the like in such a manner that the symbols to be shown are composed of such triple reflectors (U.S. Patent specification 1,821,227). This, however, requires the production of a plurality of shapes of such reflectors so as to be able to assemble all occurring symbols from reflectors in such manner. Symbols have also been represented by individual and spaced apart circular reflectors. Then, from the distance, these discrete reflectors appear as a closed line, since the beams of rays reflected by the individual reflectors intermingle in the distance. Recognizability from close up and by daylight, however, is poor.

A substantial shortcoming of all these applications of triple reflectors consists in the fact that substantial dirt deposits at the edges and joints of the reflectors and means of attachment. Practice has shown that the signs do not only become unsightly thereby, but that recognizability thereof suffers considerably.

It is the object of the present invention to avoid the disadvantages of the known arrangements. To this end, the invention provides that the reflex reflectors are arranged being a transparent cover plate which is at least partly formed with a transparent pigment layer. To the front thereof the sign shows a smooth cover plate which is safe from being attacked by dirt deposits or weathering. Triple reflectors or similarly acting reflex reflectors may be utilized (for instance dome- or acorn-shaped lenses), which ensure recognizability of the signboard for long ranges. These reflectors need not have their form adapted to be assembled to symbols, but it is only necessary that the reflectors add to complete the total surface of the sign, for instance to a rectangle. The symbols and illustrations on the sign are applied by coating the back side of the cover plate with a pigment layer. In doing so, the selection of shape and color of the symbols is not subjected to any restrictions. It is, of course, also possible to use transparently colored plastic for the cover plate. It has shown that signs assembled in such manner are distinctly recognizable by daylight and also light up clearly at night from long distances when struck by light (e.g. headlights). Then, the sign with the transparently colored cover plate looks like a large diapositive illuminated from behind.

It has been shown to be advantageous to have the cover plate consist of biaxially stretched plastic on an acrylic basis ("Plexiglas") or polycarbonate ("Makrolon"). By stretching, the molecule structure of the plastic is apparently influenced so that the plastic becomes hard and unscratchable. The pigment layer may be provided by a sprayed-on transparent lacquer on acryl or polycarbonate basis. This rather involves a polymerization of the pigment layer on the plate so that such layer very durably sticks to the cover plate. It is expedient to have the lacquer or the colored plastic adapted to be somewhat fluorescent whereby recognizability by daylight is improved.

Two embodiments of the invention are presented in the drawings and described as follows.

Figure 1:
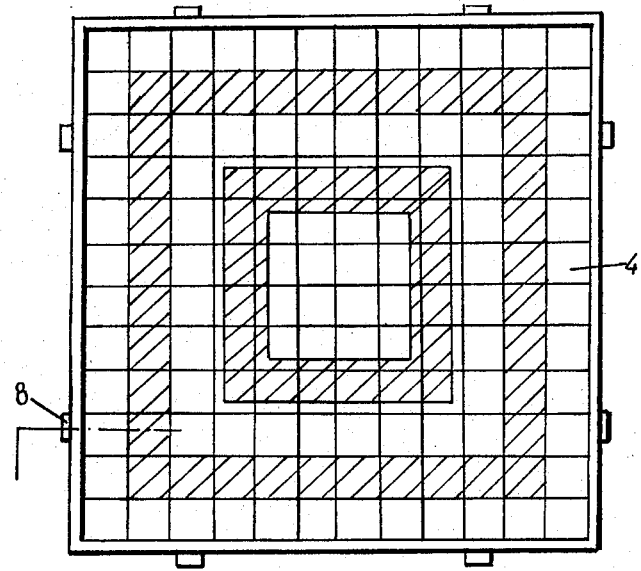
FIG. 1 is the front view of a traffic sign in accordance with the invention.
Figure 2:
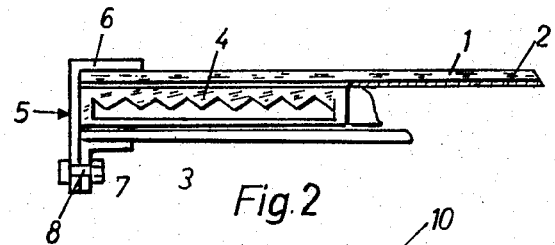
FIG. 2 is a section along lines 2—2 in FIG. 1 on an enlarged scale.

Reference numeral 1 designates a transparent plastic cover plate partly coated with a transparent pigment layer 2 from behind. Between plate 1 and a back wall 3 are positioned a plurality of of square triple reflectors 4 of a type known as such and arranged in a side by side relationship. The cover plate 1 and the back wall 3 with the intervening reflectors 4 are contained by a frame 5. Each side of frame 5 consists of two angles 6 and 7 having an L-shaped cross section and connected to each other by bolts 8. The frame 5 which sealingly abuts plate 1 and back wall 3, however, is formed with openings for ventilation and for the discharge of condensation water. The reflectors 4 are formed with a plastic body of transparent material, the front surface thereof being smooth. To the rear of the front surface of each reflector are totally reflecting triples or cube corners enclosed by an air- and watertight backing plate. Frame 5 is coated with a weatherproof plastic coating by whirl sintering.

Figure 3:
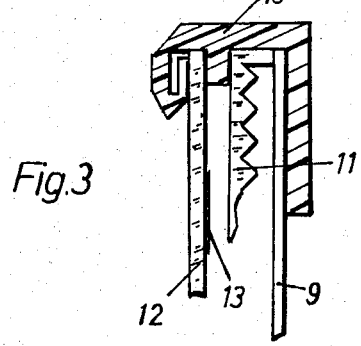
FIG. 3 is a section of another modified from of the invention.

FIG. 3 shows another embodiment of the invention which, by way of example, makes it possible to utilize conventional signs already in existence for the support and development of reflecting signboards according to the invention. Herein, frame sides 10 of relatively soft material (e.g. soft polyvinyl chloride, polyethylene, or rubber) are mounted on a base body 9 such as an already existing sign. These bars 10 sealingly contain a reflector 11 and a cover plate 12 coated with a transparent fluorescent pigment layer 13 from behind, as already hereinbefore described.

We claim:
1. A reflecting signboard for reflecting light incident thereon including, in combination, a plurality of individual and rectangularly shaped reflector units arranged in side by side relationship, said units being unconnected and being positioned in juxtaposition to form a substantially continuous reflective surface, each of said reflector units having a front transparent sheet with a plurality of triple reflector surfaces on the rear side thereof, each of said reflector units also including air and water tight backing means for hermetically sealing said reflector surfaces from the atmosphere, a transparent cover member and a back member, said reflector units being sandwiched between said members with the front sheet of each unit being in juxtaposition to said cover member, a frame about the edges of said members and holding the members together with the units sandwiched therebetween, and means defining indicia in front of said reflector surfaces and in juxtaposition to the face of the cover member; whereby signs of various sizes may be formed by selecting a plurality of units to form the sign of the desired size, selecting members of said size, sandwiching the units between the members, and affixing said frame about said members to hold the sandwiched assembly together.

2. The signboard as set forth in claim 1, wherein said transparent cover means has a rear surface and said last mentioned means comprises a transparent pigment layer coated on said rear surface forming symbols thereon and causing said signboard to appear like a large diapositive illuminated from behind when viewed from a position generally in the direction of a beam of light incident on the front portions thereof.

3. The signboard set forth in claim 1, wherein said last mentioned means comprises a partially transparent layer of material lying between said transparent cover means and said reflector units, said layer being pigmented in varying degrees to define symbols thereover.

References Cited

UNITED STATES PATENTS

| | | |
|---|---|---|
| 2,167,149 | 7/1939 | Grote. |
| 2,281,565 | 5/1942 | Eckel _____ 88—78 |
| 2,575,854 | 11/1951 | Verhagen _____ 189—64 |
| 2,910,915 | 11/1959 | Harris _____ 88—77 |
| 3,005,382 | 10/1961 | Weber. |
| 3,140,340 | 7/1964 | Weber _____ 88—82 |
| 3,176,420 | 4/1965 | Alverson _____ 88—82 X |
| 3,190,178 | 6/1965 | McKenzie _____ 88—82 |

JEWELL H. PEDERSEN, *Primary Examiner.*

DAVID H. RUBIN, *Examiner.*

O. B. CHEW, *Assistant Examiner.*